US011297173B2

(12) United States Patent
Chen

(10) Patent No.: US 11,297,173 B2
(45) Date of Patent: Apr. 5, 2022

(54) TRANSMISSION MECHANISM, DRIVING MECHANISM ASSEMBLY, AND MOBILE TERMINAL

(71) Applicant: GUANGDONG OPPO MOBILE TELECOMMUNICATIONS CORP., LTD., Guangdong (CN)

(72) Inventor: Jia Chen, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 303 days.

(21) Appl. No.: 16/698,744

(22) Filed: Nov. 27, 2019

(65) Prior Publication Data

US 2020/0177716 A1 Jun. 4, 2020

(30) Foreign Application Priority Data

Nov. 30, 2018 (CN) .......................... 201822002804.1

(51) Int. Cl.
*H04N 5/225* (2006.01)
*H04M 1/02* (2006.01)
*F16M 11/08* (2006.01)

(52) U.S. Cl.
CPC .......... *H04M 1/0264* (2013.01); *F16M 11/08* (2013.01); *H04N 5/2252* (2013.01); *H04N 5/2257* (2013.01)

(58) Field of Classification Search
CPC .. H04M 1/0264; H04M 1/0235; F16M 11/08; H04N 5/2252; H04N 5/2257
See application file for complete search history.

(56) References Cited

U.S. PATENT DOCUMENTS 7,435,018 B2 * 10/2008 Huang ................... G03B 17/04
396/419
10,893,177 B2 * 1/2021 Tsai ..................... H04N 5/2256
(Continued)

FOREIGN PATENT DOCUMENTS

CN     204350080 U     5/2015
CN     105611148 A     5/2016
(Continued)

OTHER PUBLICATIONS

The extended European Search report for EP patent application No. 21161817.8, dated May 10, 2021.
(Continued)

*Primary Examiner* — Mekonnen D Dagnew
(74) *Attorney, Agent, or Firm* — Ladas & Parry, LLP

(57) ABSTRACT

The present disclosure relates to a transmission mechanism, a driving mechanism assembly, and a mobile terminal. The mobile terminal includes: a shell including a first mounting face and second mounting face opposite the first mounting, and a side face, the first mounting face defining an accommodation groove extending to the side face along a first direction; a camera mounting assembly, including a mounting seat and a camera, wherein the mounting seat is arranged in the accommodation groove; and a driving mechanism assembly, including a driver coupled to the shell and a transmission mechanism, the driver is movable to drive, by the transmission mechanism, the mounting seat to extend from the accommodation groove and capable of driving the mounting seat to rotate around a rotating shaft and the rotating shaft being parallel to the first direction.

16 Claims, 13 Drawing Sheets

(56) References Cited

U.S. PATENT DOCUMENTS

| | | |
|---|---|---|
| 2006/0261257 A1 | 11/2006 | Hwang |
| 2015/0189175 A1 | 7/2015 | Fan et al. |
| 2017/0208226 A1* | 7/2017 | Zhang ................ H04M 1/0256 |
| 2019/0253533 A1* | 8/2019 | Fan ..................... H04M 1/0206 |

FOREIGN PATENT DOCUMENTS

| | | |
|---|---|---|
| CN | 105872339 A | 8/2016 |
| CN | 207588928 U | 7/2018 |
| CN | 207802019 U | 8/2018 |
| CN | 108600596 A | 9/2018 |
| CN | 207968579 U | 10/2018 |
| CN | 207968581 U | 10/2018 |
| CN | 108833621 A | 11/2018 |
| EP | 1596597 A1 | 11/2005 |
| EP | 3734958 A1 | 11/2020 |
| KR | 20120128740 A | 11/2012 |

OTHER PUBLICATIONS

The first examination report for IN patent application No. 201914048166, dated Jul. 26, 2021.
The extended European Search report for EP patent application No. 19211225.8, dated Jan. 22, 2020.
International search report for PCT international application No. PCT/CN2019/116742, dated Feb. 7, 2020.

* cited by examiner

TRANSMISSION MECHANISM, DRIVING MECHANISM ASSEMBLY, AND MOBILE TERMINAL

CROSS-REFERENCE TO RELATED APPLICATION(S)

The present disclosure claims priority to Chinese Patent Application No. 201822002804.1, filed on Nov. 30, 2018 and entitled "Transmission Mechanism, Driving Mechanism Assembly, Mounting Driving Assembly and Mobile Terminal", the contents of which are hereby incorporated by reference in its entirety.

TECHNICAL FIELD

The present disclosure relates to a technical field of mobile terminals, and more particularly to a transmission mechanism, a driving mechanism assembly, and a mobile terminal.

BACKGROUND

In a related art, a mobile terminal such as a smart phone is equipped with a camera on one side of a display screen. Since the camera is required to occupy a space of the side, where the display screen is located, of the phone, a coverage rate of the display screen on a front face of the phone is relatively low, which is unfavorable for increase of a screen-to-body ratio of the mobile phone. In addition, when a user holds the mobile phone with the camera facing a certain fixed direction, the camera is able to shoot facing the fixed direction only, and may not implement automatic panoramic shooting.

SUMMARY

In an aspect of the present disclosure, a mobile terminal is provided, which includes:
a shell including a first mounting face a second mounting face opposite the first mounting face, and a side face coupled between the first mounting face and the second mounting face, the first mounting face defining an accommodation groove extending to the side face along a first direction;
a camera mounting assembly including a mounting seat and a camera arranged on the mounting seat, wherein the mounting seat is arranged in the accommodation groove and an image acquisition face of the camera faces the first mounting face or the second mounting face; and
a driving mechanism assembly including a driver coupled to the shell and a transmission mechanism, wherein the transmission mechanism is arranged between an output end of the driver and the mounting seat and the driver is configured to drive, by the transmission mechanism, the mounting seat to extend from the accommodation groove to a first position and a second position; at the first position, the image acquisition face of the camera exposes from the shell; between the first position and the second position, the driver is movable to drive, by the transmission mechanism, the mounting seat to rotate around a rotating shaft, and the rotating shaft is parallel to the first direction; the mounting seat is movable to keep the image acquisition face hidden in the accommodation groove.

In another aspect of the present disclosure, a transmission mechanism is provide, which includes:
a rotating member;
a support rod coupled to the rotating member;
a driving member coupled to one end of the rotating member; and
a driven member, coupled to the support rod,
wherein, the rotating member is drivable to drive the support rod to move to a first position and a second position along a length extension direction of the rotating member in response to the rotating member rotating; the driving member drives the support rod to rotate around a rotating shaft under a cooperation with the driven member in response to the support rod being between the first position and the second position, and an extension direction of the rotating shaft is as same as the length extension direction of the rotating member.

In an additional aspect of the present disclosure, a driving mechanism assembly is provide, which includes:
a transmission mechanism including:
a rotating member
a support rod coupled to the rotating member,
a driving member coupled to one end of the rotating member; and
a driven member coupled to the support rod,
wherein, the rotating member is drivable to drive the support rod to move to a first position and a second position along a length extension direction of the rotating member in response to the rotating member rotating; the driving member drives the support rod to rotate around a rotating shaft under a cooperation with the driven member in response to the support rod being between the first position and the second position, and an extension direction of the rotating shaft is as same as the length extension direction of the rotating member; and
a driver, an output end of the driver being coupled to the end, far away from the driving member, of the rotating member.

BRIEF DESCRIPTION OF THE DRAWINGS

In order to describe the technical solutions in embodiments of the present disclosure or a conventional art more clearly, the drawings required to be used for descriptions about the embodiments or the conventional art will be simply introduced below. It is apparent that the drawings described below are only some embodiments of the present disclosure. Those of ordinary skill in the art may further obtain other drawings according to these drawings without creative work.

DETAILED DESCRIPTION OF THE EMBODIMENTS

Figure 1:
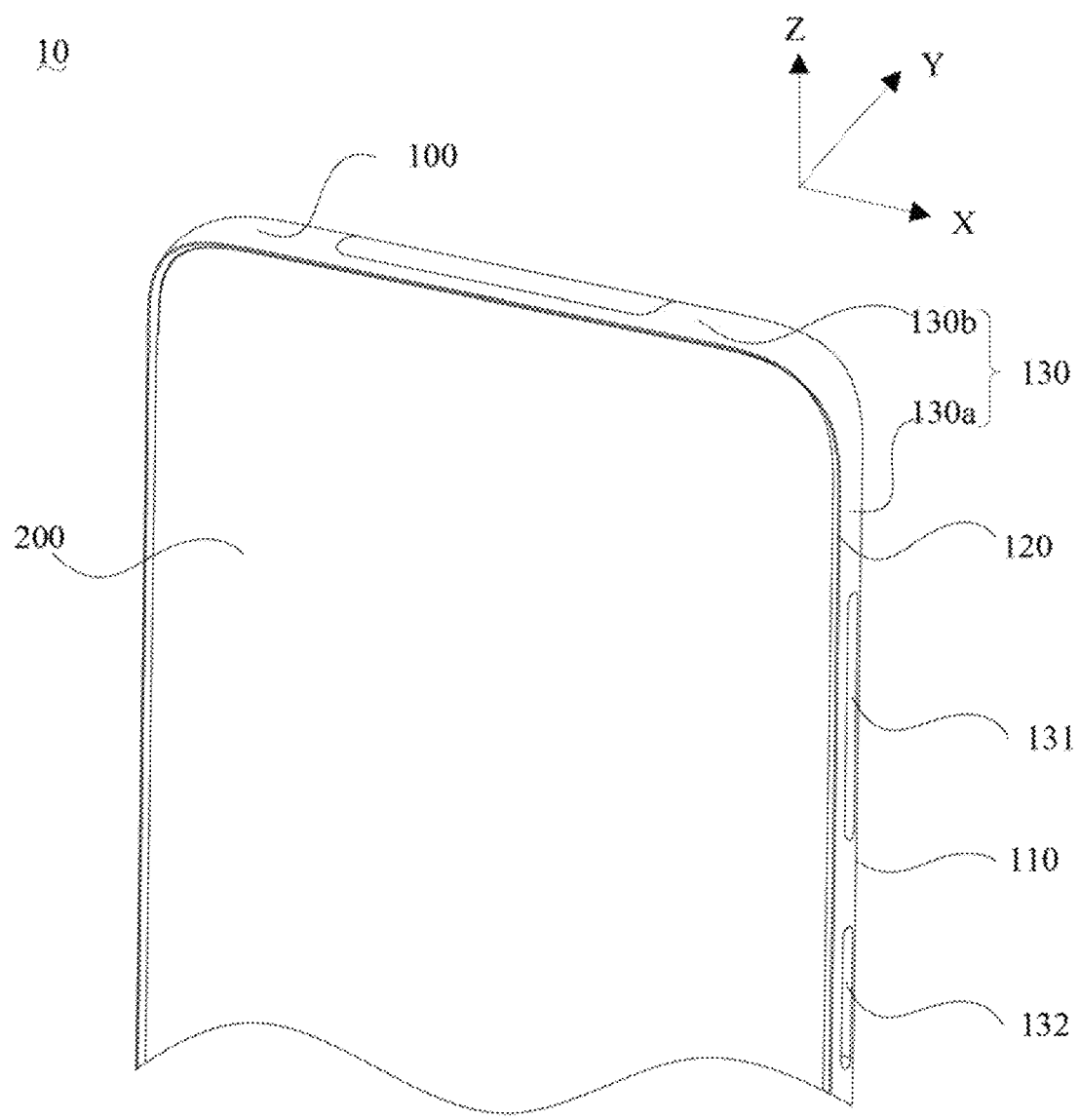
FIG. 1 is a structure diagram of a part of a structure of a mobile terminal according to an embodiment of the present disclosure.
Figure 2:
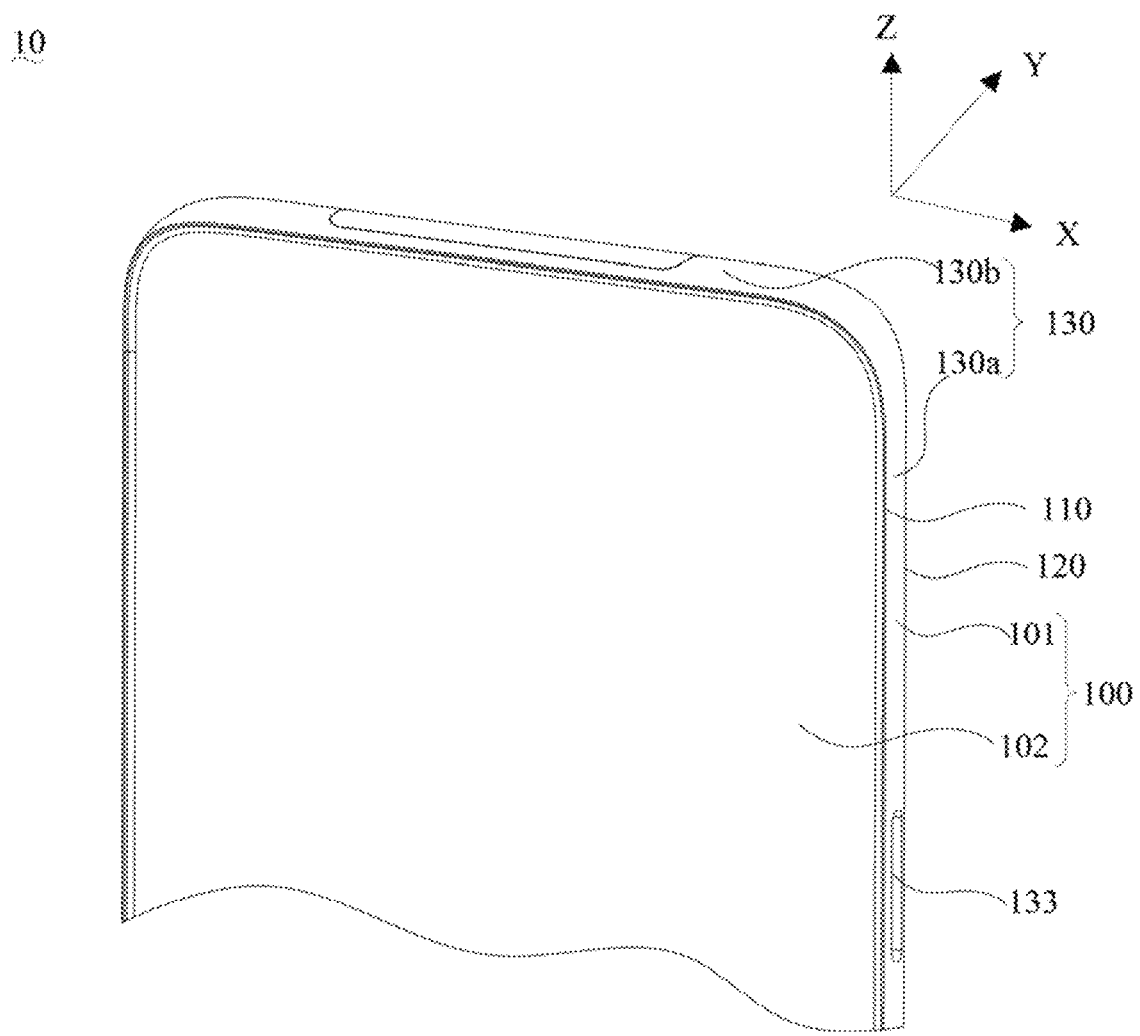
FIG. 2 is a structure diagram of the structure shown in FIG. 1 from another angle.
Figure 3:
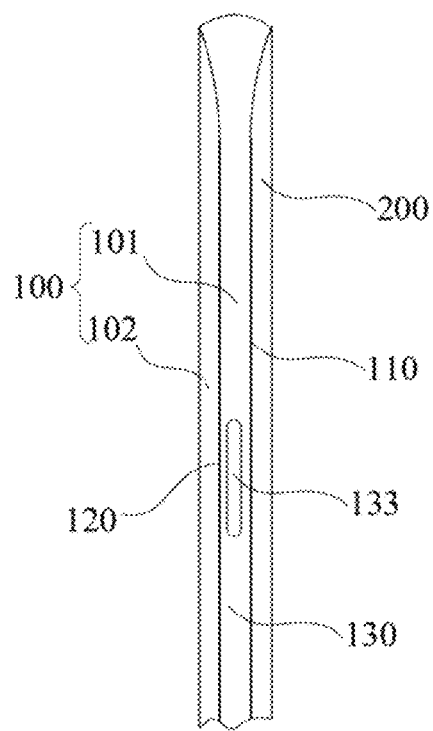
FIG. 3 is a left view of the structure shown in FIG. 1.
Figure 4:
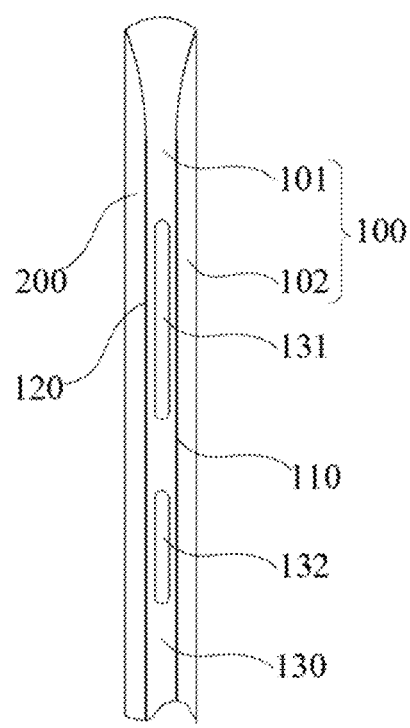
FIG. 4 is a right view of the structure shown in FIG. 1.

For conveniently understanding the present disclosure, the present disclosure will be described below more comprehensively with reference to related drawings. The preferred embodiments of the present disclosure are shown in the drawings. However, the present disclosure may be implemented in many different forms and is not limited to the embodiments described herein. Instead, these embodiments are provided to make the contents disclosed in the present disclosure more thoroughly and comprehensively.

"Terminal device" used here includes, but not limited to, a device connected in any one or more of the following connection manners and capable of receiving and/or sending a communication signal:

(1) a wired connection manner, for example, a Public Switched Telephone Network (PSTN), a Digital Subscriber Line (DSL), a digital cable and direct cable connection; and (2) a wireless interface manner, for example, a cellular network, a Wireless Local Area Network (WLAN), a digital television network like a Digital Video Broadcasting Handheld (DVB-H) network, a satellite network and an Amplitude Modulation (AM)-Frequency Modulation (FM) broadcast transmitter.

A terminal device is configured to communicate by a wireless interface may be called a "mobile terminal". Examples of the mobile terminal include, but not limited to, the following electronic devices:

(1) a satellite phone or a cell phone;

(2) a Personal Communication System (PCS) terminal capable of integrating a cellular radio phone and data processing, faxing and data communication capabilities;

(3) a radio phone, a pager, Internet/intranet access, a Web browser, a memo pad, a calendar and a Personal Digital Assistant (PDA) equipped with a Global Positioning System (GPS) receiver;

(4) a conventional laptop and/or palmtop receiver, and (5) a conventional laptop and/or palmtop radio phone transceiver and the like.

Referring to FIG. 1 to FIG. 5, a mobile terminal is described in an embodiment with a mobile phone as an example. The mobile terminal 10 includes a shell 100, a display screen 200, a camera mounting assembly 300 and a driving mechanism assembly 400.

The shell 100 is an assembling carrier of the display screen 200, the camera mounting assembly 300, the driving mechanism assembly 400 and the like. The shell 100 may be made from a metallic material, for example, aluminum, an aluminum alloy or stainless steel. The shell 100 includes a first mounting face 110, a second mounting face 120 opposite the first mounting face, and a side face 130 coupled between the first mounting face 110 and the second mounting face 120. Opposite may be understood as follows: for example, along a thickness direction of the side face 130 (a Y-axis direction in FIG. 1), a reference plane parallel to an XZ plane is defined at a certain point position in middle of the side face 130, all points on the first mounting face 110 are positioned on one side of the reference plane, and all points on the second mounting face 120 are positioned on the other opposite side of the reference plane.

The second mounting face 120 of the shell 100 may be configured to mount the display screen 200, and the first mounting face 110 of the shell 100 may be configured to mount the camera mounting assembly 300 and the driving mechanism assembly 400. In an embodiment, the shell 100 may include a middle frame 101, the middle frame 101 having a first mounting face 110 and a second mounting face 120 opposite the first mounting face 110; an outer wall face of the middle frame 101 is the side face 130 of the shell 100, and the display screen 200 is fixed on the second mounting face 120 of the middle frame 101. The first mounting face 110 of the middle frame 101 may carry other components of the mobile terminal 10, for example, the camera mounting assembly 300 and the driving mechanism assembly 400. In other embodiments, the first mounting face 110 of the middle frame 101 may also carry a control component (including a main board and a line), a power component and the like. In an embodiment, the shell 100 may further include a rear cover 102, and the rear cover 102 is combined with the first mounting face 110 of the middle frame 101 to seal each component mounted on the first mounting face 110 of the middle frame 101.

The side face 130 of the shell 100 may be define a structure such as a groove and a hole to assemble an element realizing a specific function or to detachably connect a peripheral element of the element realizing the specific function with the mobile terminal 10 or as a channel for input and output of a signal such as a sound. For example, FIG. 1 to FIG. 5, as an example, show a first mounting groove 131, a second mounting groove 132 and a third mounting groove 133 defined in the side face 130. Wherein the first mounting groove 131 may be configured to mount a volume control button to realize a function of regulating a playing volume of audio information of the mobile terminal 10 and the like. The second mounting groove 132 may be configured to mount a Subscriber Identity Module (SIM) card. The third mounting groove 133 may be configured to mount a power button. It is to be noted that specific positions of the first mounting groove 131, the second mounting groove 132 and the third mounting groove 133 on the side face 130 are not limited and may be changed according to a requirement.

The display screen 200 is configured to display information. The display screen 200 may be a Liquid Crystal Display (LCD) or an Organic Light-Emitting Diode (OLED) display screen. In an embodiment, the display screen 200 is a touch display screen, and a user may execute a touch operation on the information displayed on the display screen 200 in a touch operation manner. In other embodiments, the display screen 200 may also be a non-touch display screen only configured to display the information. In other embodiments, the display screen 200 may also be eliminated.

Figure 5:
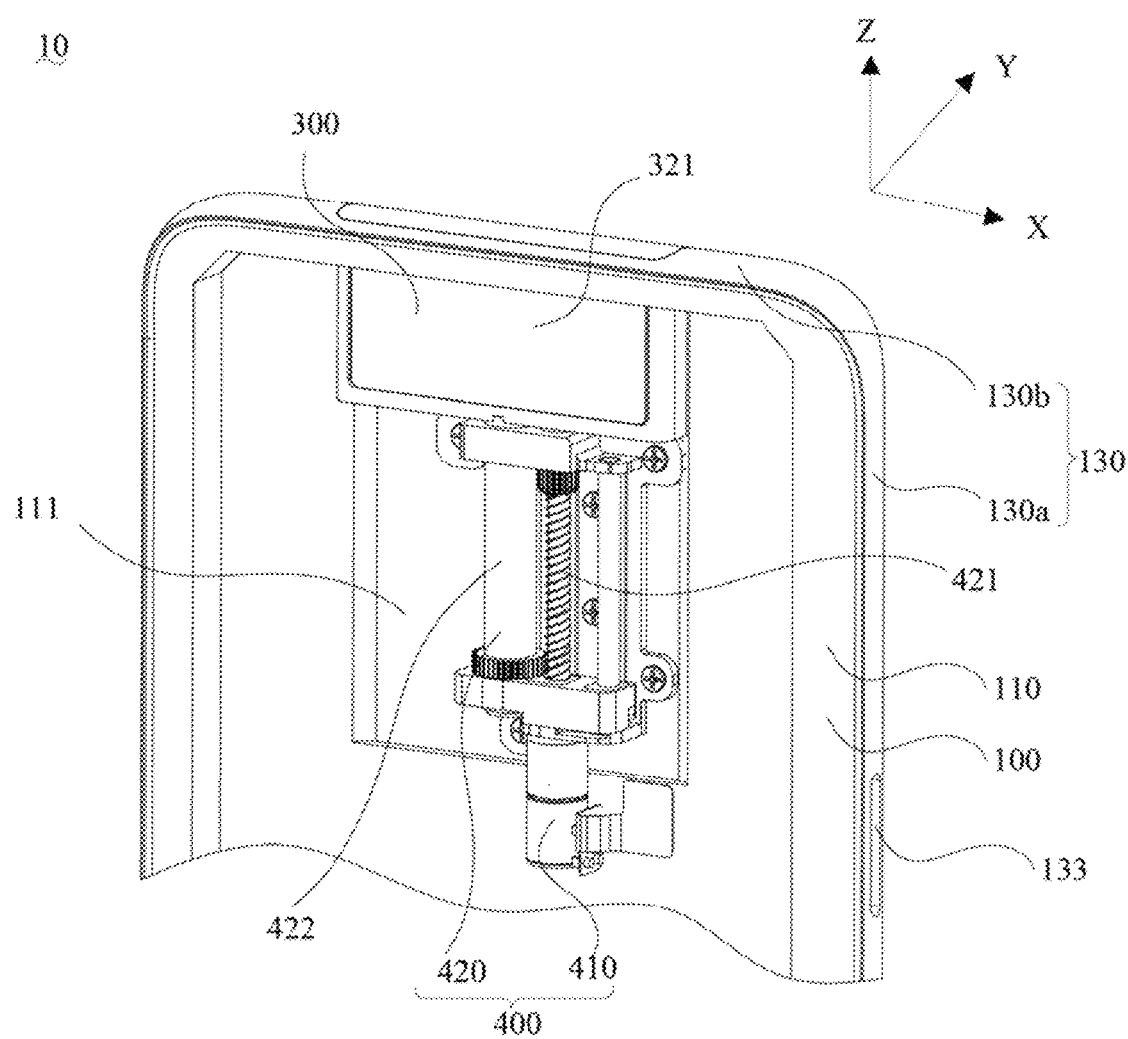
FIG. 5 is a structure diagram of the structure shown in FIG. 2 after a rear cover is concealed.
Figure 6:
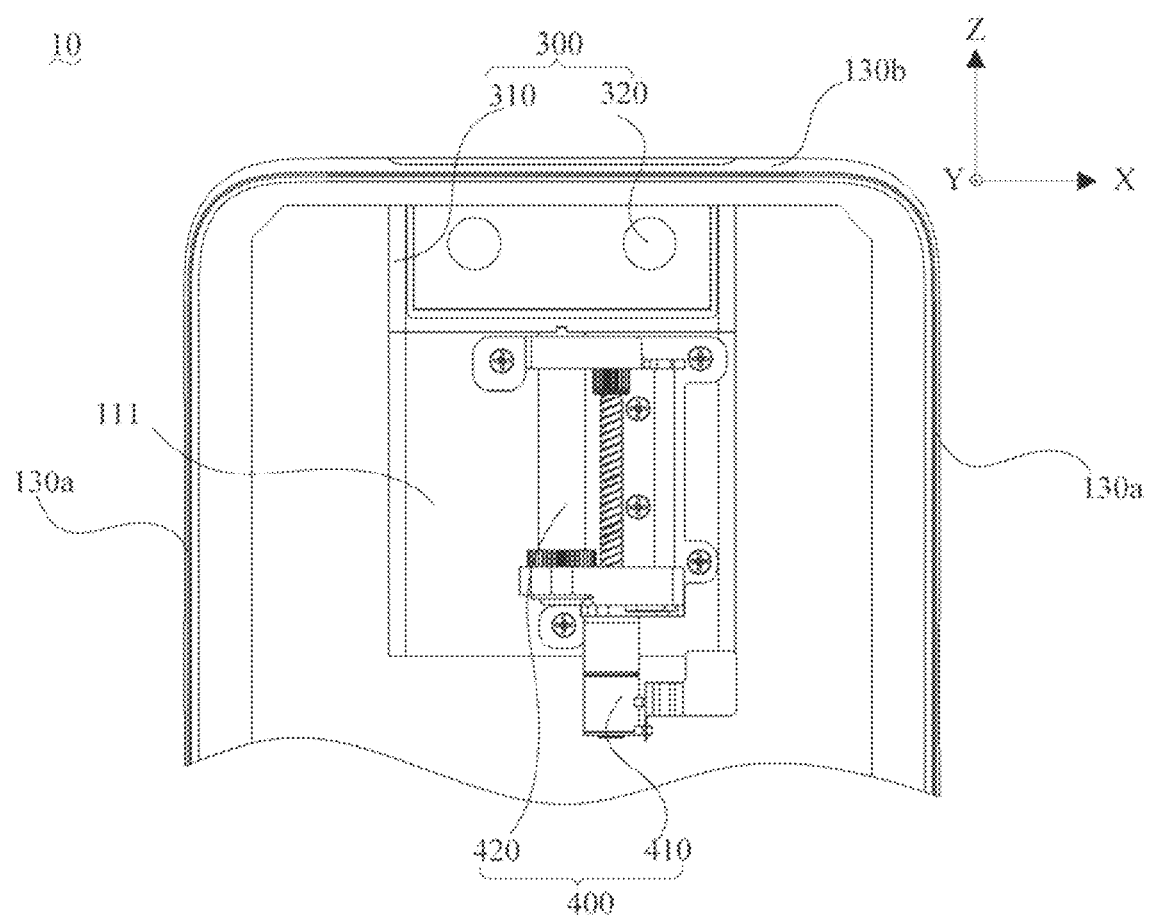
FIG. 6 is a front view of the structure shown in FIG. 5 after dustproof glass is concealed.

In combination with FIG. 5 and FIG. 6, in an embodiment, the camera mounting assembly 300 includes a mounting seat 310 and a camera 320 arranged on the mounting seat 310, functions of video call, photographing and the like may be provided for the mobile terminal 10 by photographing and camera shooting functions of the camera 320, and dustproof glass 321 may be arranged on an incident face of the camera 320 to prevent dust. It can be understood that, in the other embodiments, the camera mounting assembly 300 may further include a device, for example, a light sensor and a flashlight, arranged on the mounting seat 310 to assist the camera 320 in shooting or another functional device that is independent of the shooting function of the camera 320 (for example, an iris recognition module, a face recognition module, a proximity sensor, an ambient light sensor, a microphone, a receiver and a fingerprint module).

Still referring to FIG. 5 and FIG. 6, in an embodiment, the first mounting face 110 of the shell 100 is define an accommodation groove 111 extending to the side face 130 of the shell 100 along a first direction (i.e., a Z-axis direction in the figures). The side face 130 includes two first side faces 130a faced away from each other and two second side faces 130b faced away from each other, a length value of the first side face 130a is larger than a length value of the second side face 130b, the accommodation groove 111 extends to the second side face 130b along the first direction, and the first direction is as same as a length extension direction of the first side face 130a. It can be understood that, in other embodiments, the accommodation groove 111 may also extend to the first side face 130a along a second direction (i.e., an X-axis direction in the figures), and the second direction is as same as a length extension direction of the second side face 130b. The mounting seat 310 may extend from or into the accommodation groove 111 (namely extending from or into the side face 130). Then, when the camera 320 is required to be used for shooting, the mounting seat 310 extends from the accommodation groove 111 together with the camera 320 for shooting, and after shooting is completed, the mounting seat 310 extends into the accommodation groove 111 together with the camera 320, so that a space of the side where the display screen 200 is positioned may be prevented from being occupied by the camera 320, a coverage rate of the display screen 200 on the second mounting face 120 is increased, and a screen-to-body ratio of the display screen 200 is increased. In an embodiment, the mounting seat 310 forms sliding fit with the accommodation groove 111. Therefore, stability of the mounting seat 310 in a process of extending from or into the accommodation groove 111 may be improved. It can be understood that, in other embodiments, the mounting seat 310 may also not directly contact with a groove wall of the accommodation groove 111. It is to be noted that the first direction and the second direction are introduced for convenient description and should not be understood as that the accommodation groove 111 in the technical solution of the present disclosure may only extend along the first direction or second direction shown in the figures. For example, in other embodiments, the accommodation groove 111 may extend along a diagonal direction of the mobile terminal 10.

The camera 320 may refer to multiple cameras (for example, double cameras), and may also refer to a single camera, and an image acquisition face (i.e., incident face) of the camera 320 faces the first mounting face 110 such that the camera is used as a rear camera. It can be understood that, in other embodiments (not shown in the figures), the image acquisition face of the camera may also face the second mounting face such that the camera is used as a front camera.

Figure 7:
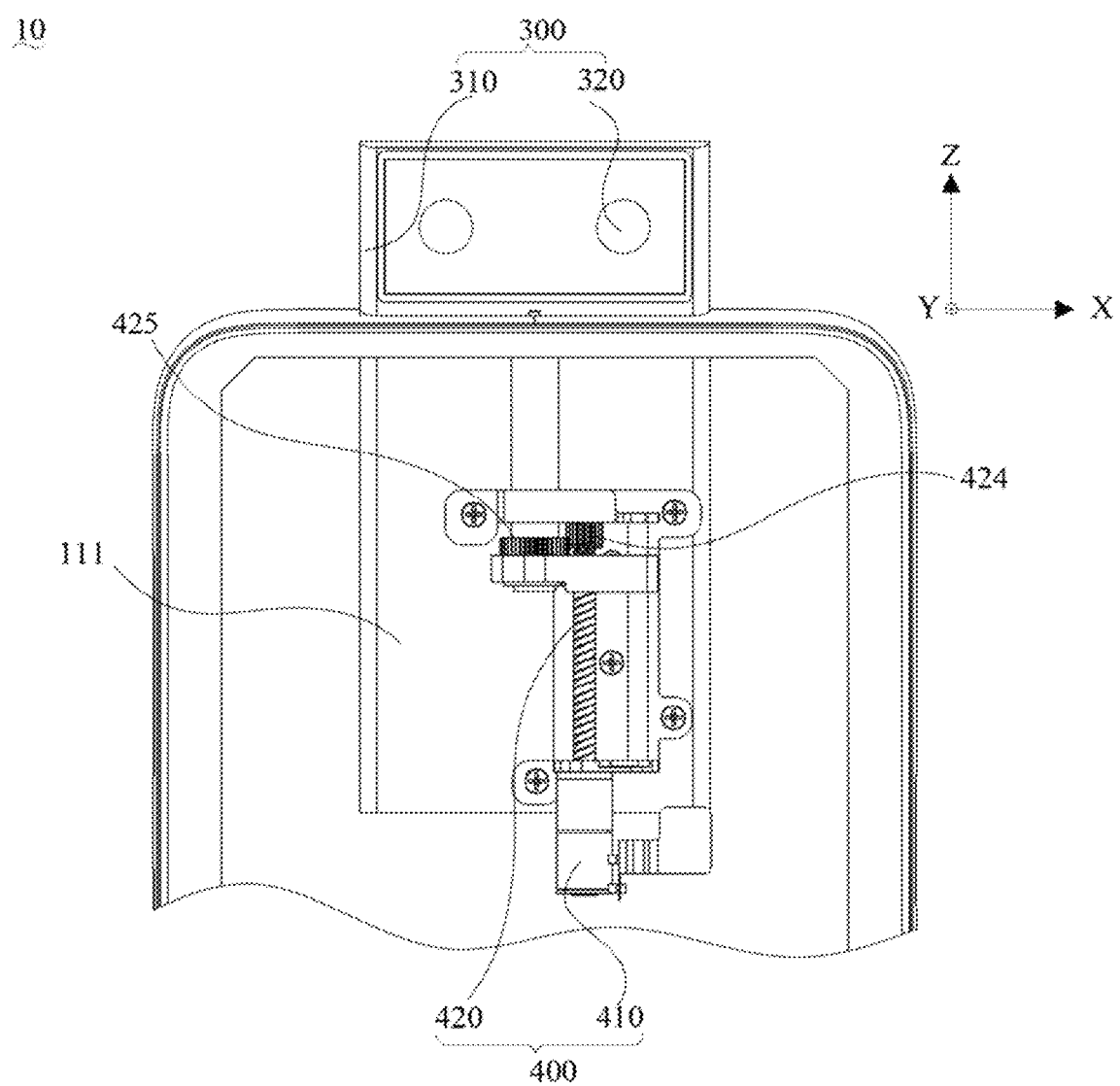
FIG. 7 is a structure diagram when a mounting seat in FIG. 6 extends from an accommodation groove to a first position.
Figure 8:
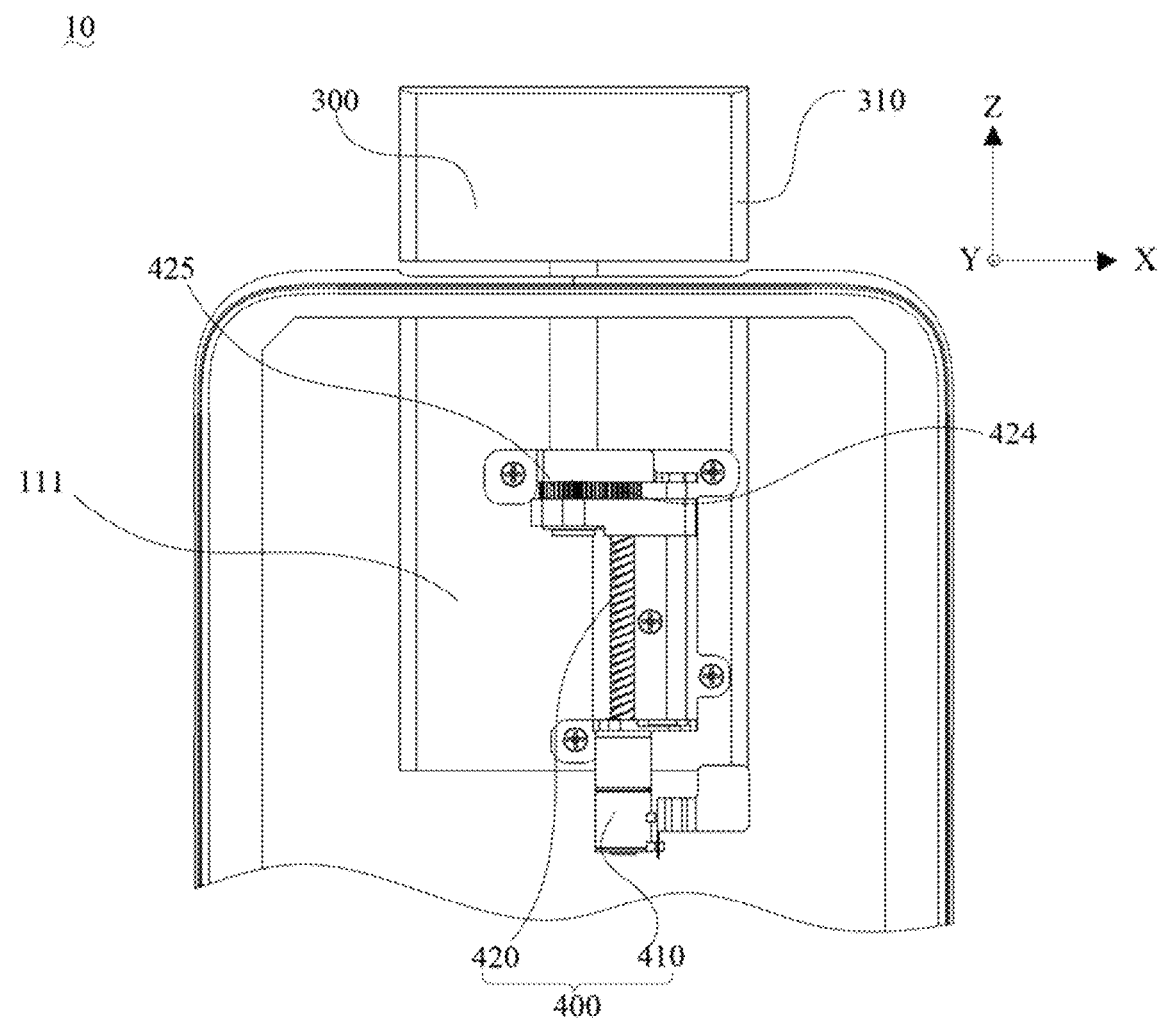
FIG. 8 is a structure diagram when the mounting seat in FIG. 6 extends from the accommodation groove to a second position.

Referring to FIG. 6, FIG. 7 and FIG. 8, in an embodiment, when the mounting seat 310 extends from the accommodation groove 111 by a certain distance till a first position (shown in FIG. 7), the image acquisition face of the camera 320 is exposed from the shell 100, and in such case, a driving member 424 cooperates with a driven member 425. In a process that the mounting seat 310 continues extending outwards from the first position to a second position (shown in FIG. 8), the mounting seat 310 may also rotate around a rotating shaft parallel to the first direction to change a shooting direction of the camera 320, namely changing a direction of the image acquisition face of the camera 320. The mounting seat 310 may rotate around a Z axis shown in FIG. 8. Then, when the mounting seat 310 extends from the accommodation groove 111 to a position between the first position and the second position, the camera 320 may be switched between a front shooting mode and a rear shooting mode every time when the mounting seat 310 rotates 180 degrees relative to the shell 100, and the camera 320 may be used as a front or rear camera according to a using requirement. Therefore, not only may the number of the camera 320 be reduced, but also panoramic shooting may be implemented in a rotating process of the camera 320.

The camera mounting assembly 300 and the driving mechanism assembly 400 may be combined into a mounting driving assembly. Still referring to FIG. 6, FIG. 7 and FIG. 8, the driving mechanism assembly 400 includes a driver 410 coupled to the shell 100 and a transmission mechanism 420, the transmission mechanism 420 is arranged between an output end of the driver 410 and the mounting seat 310, the driver 410 is configured to drive, by the transmission mechanism 420, the mounting seat 310 to extend from the accommodation groove 111 to the first position and the second position; at the first position, the image acquisition face of the camera 320 exposes from the shell 100; between the first position and the second position, the driver 410 is movable to drive, by the transmission mechanism 420, the mounting seat 310 to rotate around the rotating shaft, and the rotating shaft is parallel to the first direction; the mounting seat 310 is movable to keep the image acquisition face hidden in the accommodation groove 111. For example, the mounting seat 310 is able to automatically return to the accommodation groove 111 under an action of the driving mechanism assembly 400, and the mounting seat 310 may also be manually returned. Therefore, the mounting seat 310 may realize extension, retraction and rotation functions by the same driver 410. The driver 410 is able to be a motor.

Figure 9:
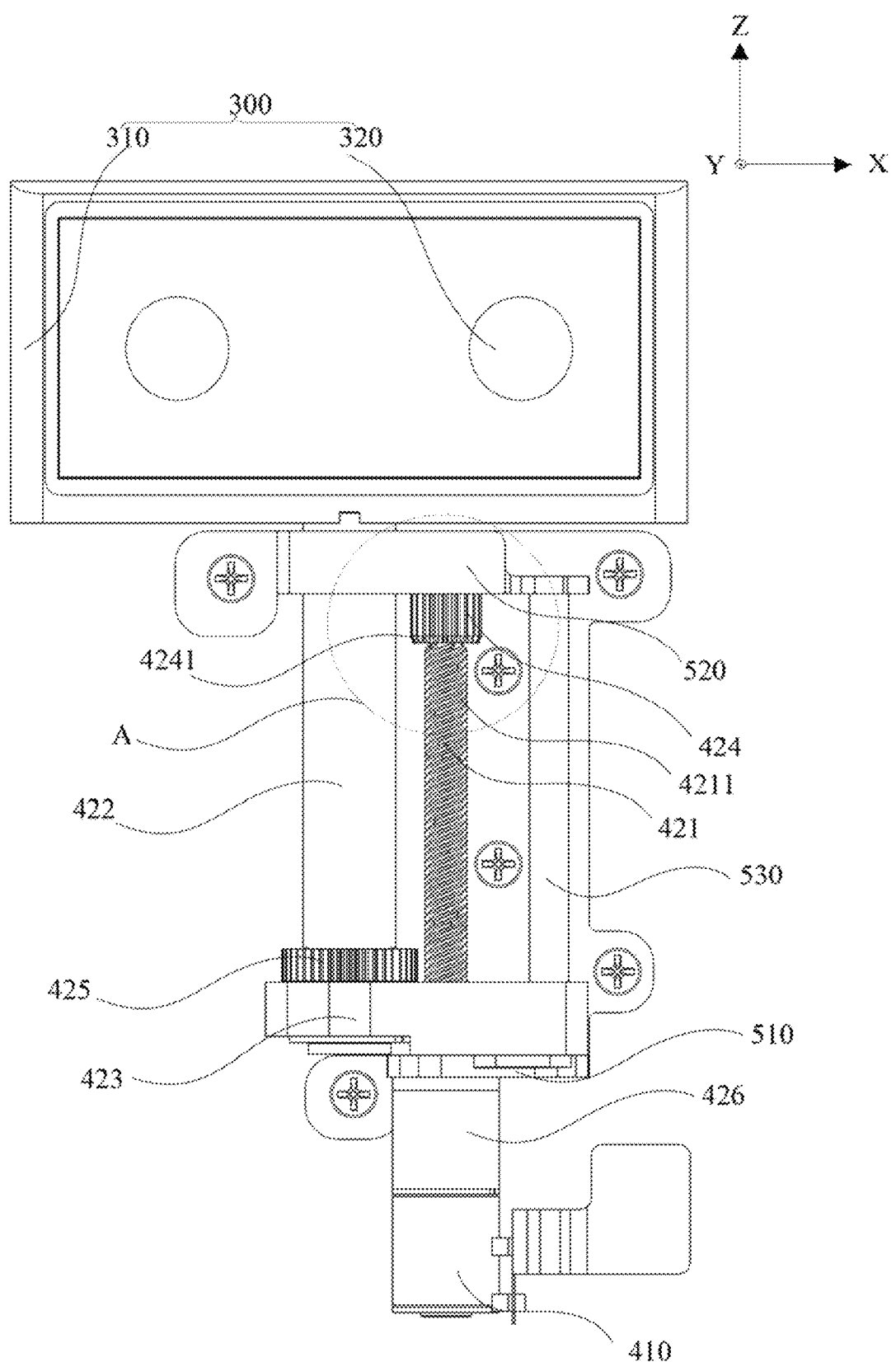
FIG. 9 is an enlarged view of a mounting driving assembly in FIG. 6.

In an embodiment, in combination with FIG. 7, FIG. 8 and FIG. 9, the transmission mechanism 420 includes a rotating member 421 coupled to the output end of the driver 410 and a support rod 422 arranged on the mounting seat 310 and cooperated with the rotating member 421, and the driver 410 may drive, by the rotating member 421 and the support rod 422, the mounting seat 310 to extend from or into the accommodation groove 111. In other embodiments, the driving mechanism assembly 400 includes a gearbox 426 coupled between the output end of the driver 410 and the rotating member 421 to reduce a starting inertia of the driver 410 (for example, motor), obtain a higher output torque and reduce cost and electric energy loss of the driver 410. A hollow structure design is able to be adopted for the support rod 422 to reduce materials and weight of the support rod 422 and reduce the cost. In addition, the support rod 422 of a hollow structure is favorable for a wire layout of the functional device of the camera mounting assembly 400.

Figure 10:
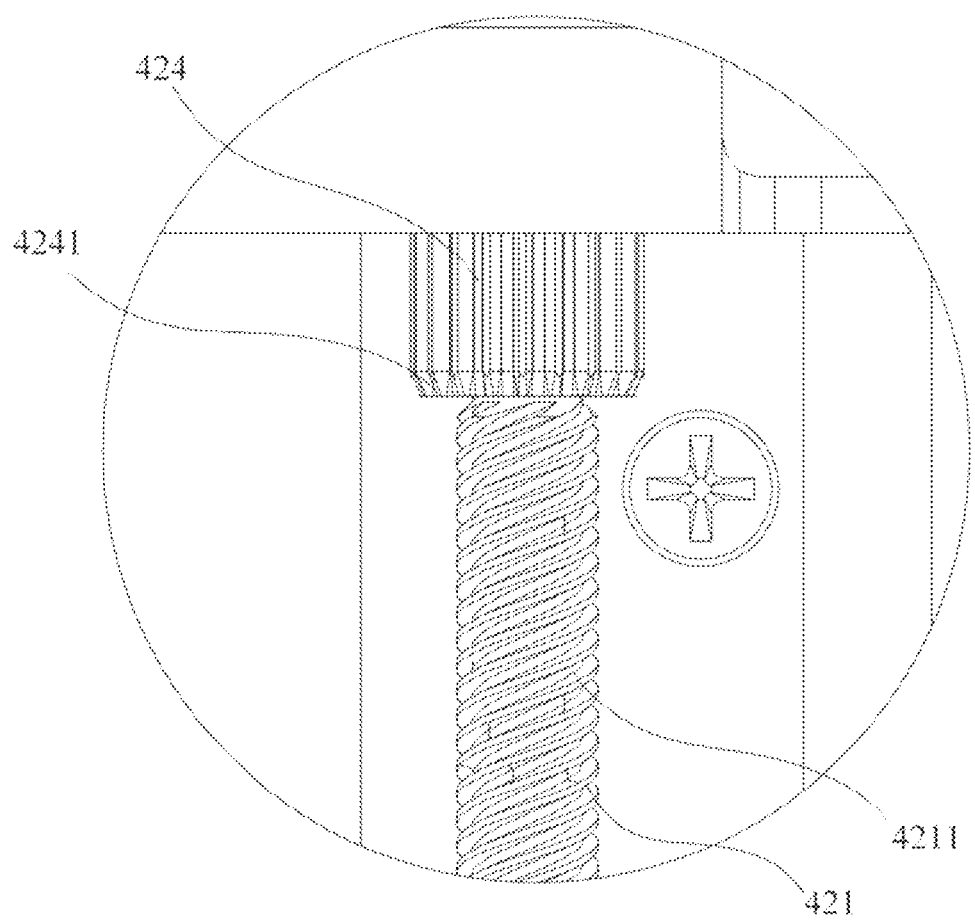
FIG. 10 is an enlarged view of Part A in FIG. 9.

The transmission mechanism 420 includes the driving member 424 coupled to an end, having a larger distance to the driver 410, of the rotating member 421, and the driven member 425 coupled to the support rod 422. The driver 410 is drivable, by a cooperation between the driving member 424 and the driven member 425, to move the mounting seat 310 to rotate around the rotating shaft in response to the mounting seat 310 extending from the accommodation groove 111 and being between the first position and the second position, and in such case, the rotating shaft is overlapped with a central axis of the support rod 422. In an embodiment, the driving member 424 includes a driving gear, the driven member 425 includes a driven gear, the driving gear is arranged in the rotating member 421 in a penetration manner and coupled to the rotating member 421, the driven gear is arranged in the support rod 422 in a penetration manner and coupled to the support rod 422, and the driving gear is meshed with the driven gear such that the mounting seat 310 is able to rotate under an action of the driver 410. Furthermore, as shown in FIG. 10, chamfers are arranged on a side, having a shorter distance to the driven gear, of gear teeth of the driving gear to promote contact meshing between the driving gear and the driven gear and reduce wear of the driving gear and the driven gear during contact meshing to prolong service life of the driving gear and the driven gear. It can be understood that, in other embodiments (not shown in the figures), the chamfers 4241 may also be arranged on a side, having a shorter distance to the driving gear, of gear teeth of the driven gear, or both arranged on a side of the gear teeth of the driving gear and a side opposite the driving gear of the gear teeth of the driven gear. It can be understood that, the mounting seat 310 rotates 180 degrees around the rotating shaft in response to the mounting seat 310 moving from the first position to the second position. For example, widths of the driving gear and the driven gear may be set to enable the mounting seat to rotate 180 degrees when the mounting seat 310 moves between the first position and the second position to adapt a direction of the incident face to shooting mode selection of the user.

Figure 11:
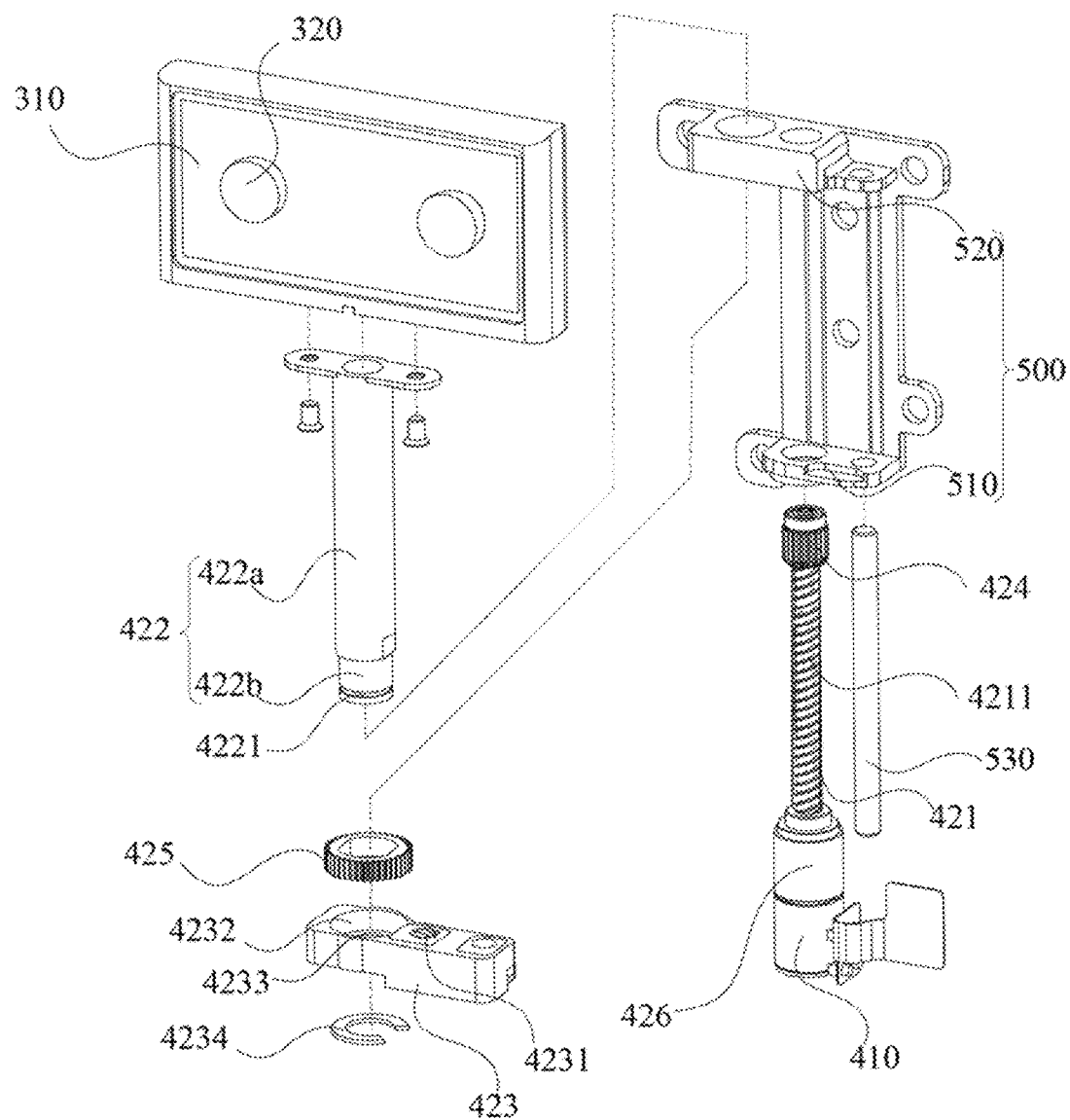
FIG. 11 is an exploded view of FIG. 9.
Figure 12:
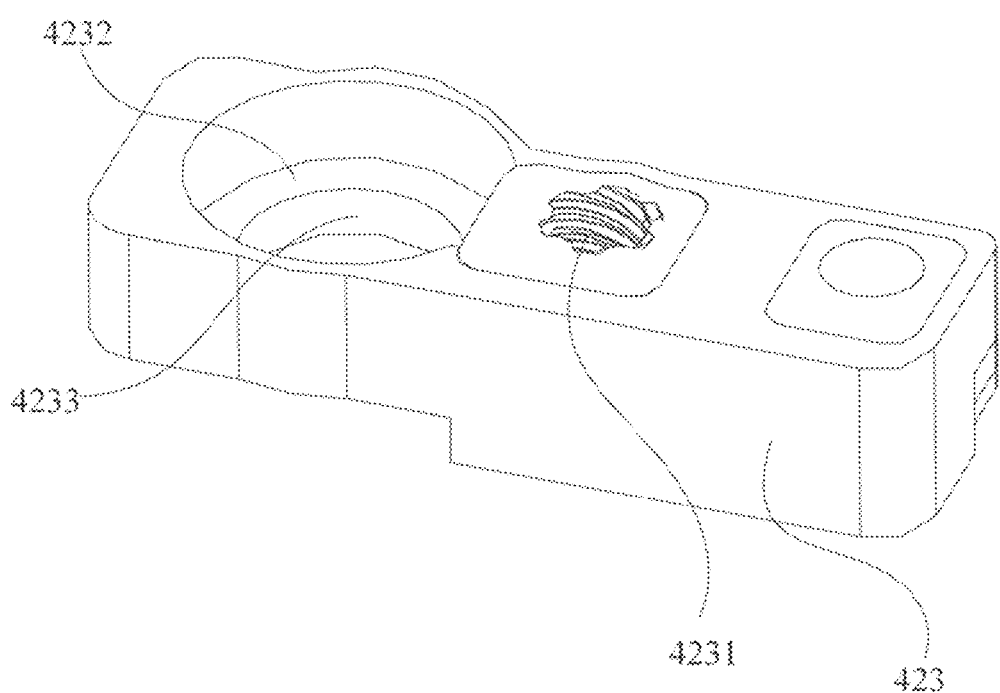
FIG. 12 is an enlarged view of a connecting block in FIG. 11.

In an embodiment, still referring to FIG. 7, FIG. 8 and FIG. 9, the driver 410 includes a motor and the rotating member 421 includes a screw rod; a peripheral side of the screw rod, defines a spiral groove 4211; the transmission mechanism 420 includes a connecting block 423, the connecting block 423 is coupled to an end, having a larger distance to the mounting seat 310 in a rotating manner, of the support rod 422; the connecting block 423 is provided with a fitting portion, and the fitting portion is embedded into the spiral groove 4211 to connect the connecting block 423 and the screw rod in a sliding manner. In an embodiment, as shown in FIG. 11 and FIG. 12, the fitting portion is a fitting hole 4231 defined in the connecting block 423, an inner wall of the fitting hole 4231 is embedded into the spiral groove 4211 to connect the connecting block 423 and the screw rod in the sliding manner, and the motor is configured to drive the screw rod to rotate to drive, by a cooperation between the connecting block 423 and the screw rod, the connecting block 423, the support rod 422 and the mounting seat 310 to slide as a whole in the accommodation groove 111 along the first direction. When the mounting seat 310 is between the first position and the second position, the support rod 422 and the mounting seat 310 rotate by taking a length extension direction of the support rod 422 as a rotating axis, and rotate relative to the connecting block 423, and the length extension direction of the support rod 422 is as same as a length extension direction of the rotating member 421. i.e., the first direction shown in the figures. It can be understood that, in other embodiments (not shown in the figures), the connecting block 423 and the support rod 422 are fixed and integrated together. In such case, the connecting block 423 may be embedded into the spiral groove 4211 for sliding connection with the screw rod as a part of a structure of the support rod 422. The connecting block 423 is farther than the driven member 425 away from the mounting seat 310. The motor is configured to drive the screw rod to rotate to drive the connecting block 423, the support rod 422 and the mounting seat 310 to slide in the accommodation groove 111 along the first direction. When the mounting seat 310 is between the first position and the second position, the connecting block 423, the support rod 422 and the mounting seat 310 rotate together by taking the length extension direction of the support rod 422 as a rotating axis. When the support rod 422 is a standard cylindrical rod-shaped structure, the rotating shaft is the central axis of the support rod 422.

Figure 13:
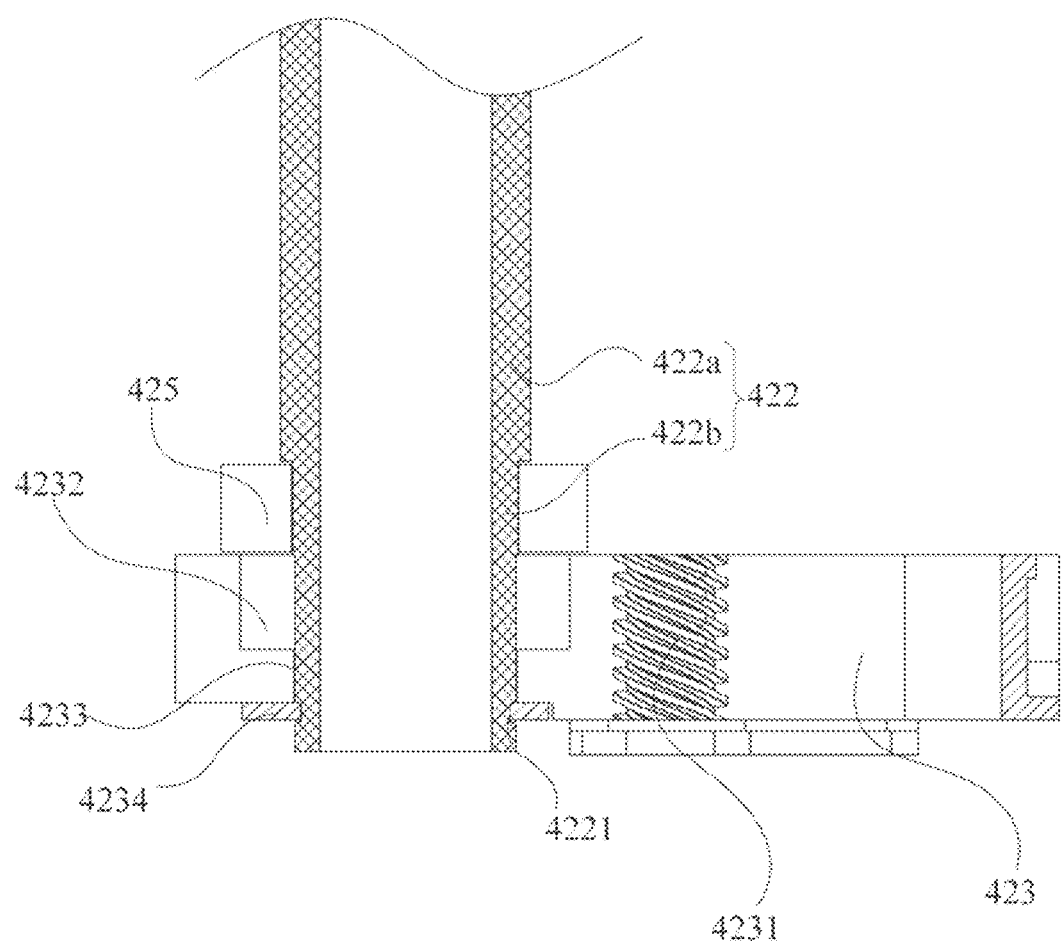
FIG. 13 is a sectional view after a support rod is coupled to the connecting block in FIG. 11.

For connecting the support rod 422 and the connecting block 423 and also implementing rotation of the support rod 422 relative to the connecting block 423, in an embodiment, referring to FIG. 11, FIG. 12 and FIG. 13, the support rod 422 includes a body 422a and a bump 422b arranged at an end, far away from the mounting seat 310, of the body 422a, a circumferential diameter of the bump 422b is smaller than a circumferential diameter of the body 422a, and the bump 422b is provided with an annular limiting groove 4221. The connecting block 423 is provided with a mounting groove 4232 and a mounting hole 4233 defined in a groove bottom of the mounting groove 4232, the bump 422b is sequentially arranged in the mounting groove 4232 and the mounting hole 4233 along the first direction, a circumferential diameter of the body 422a is in the diameter ranges from a diameter of the mounting groove 4232 to a diameter of the mounting hole 4233. A snap spring 4234 is arranged at an end, far away from the mounting seat 310, of the connecting block 423, and after the bump 422b is arranged in the mounting groove 4232 and the mounting hole 4233 in the penetration manner, an inner side portion of the snap spring 4234 may be embedded into the annular limiting groove 4221, and the other outer side portion of the snap spring 4234 is abutted against an end, far away from the mounting seat 310, of the connecting block 423. The driven member 425 arranged on the bump 422b in a sleeving manner and coupled to the bump 422b, the driven member 425 is arranged outside the mounting groove 4232 to cooperate with the driving member 424, and the driven member 425 is abutted against an end face, close to the mounting seat 310, of the connecting block 423. Therefore, abutting the driven member 425 against the end face, close to the mounting seat 310, of the connecting block 423 and implementing a cooperation between the snap spring 4234 and the annular limiting groove 4221 of the bump 422b may implement firm fixation, to the connecting block 423, and rotation, relative to the connecting block 423, of the support rod 422.

In an embodiment, as shown in FIG. 9 and FIG. 11, the mobile terminal 10 includes a bracket 500 coupled to the shell 100, and the bracket 500 is configured to mount the driving mechanism assembly 400. The bracket 500 includes a first bracket 510 and a second bracket 520; and the first bracket 510 and the second bracket 520 may be fixed and integrated together, and may also be connected detachably. The first bracket 510, the second bracket 520 and the mounting seat 310 are sequentially arranged along the first direction. The driver 410 is fixed to the first bracket 510, the output end of the driver 410, after being arranged in the first bracket 510 in a penetration manner, is coupled to the rotating member 421 between the first bracket 510 and the second bracket 520, and the support rod 422 is arranged in the second bracket 520 in a penetration manner and fixed to the connecting block 423 between the first bracket 510 and the second bracket 520. The inner wall of the fitting hole 4231 of the connecting block 423 is embedded into the spiral groove 4211 to connect the connecting block 423 and the rotating member 421 in the sliding manner within a travel range between the first bracket 510 and the second bracket 520. Therefore, stability of the support rod 422 in an extension and retraction process may be ensured.

In an embodiment, still referring to FIG. 9 and FIG. 11, a balancing rod 530 arranged in the connecting block 423 in a penetration manner is arranged between the first bracket 510 and the second bracket 520, and the balancing rod 530 extends along the first direction. Therefore, the connecting block 423 is able to be driven by the driver 410 to slide along the balancing rod 530 to improve stability in a movement process. A hollow structure design may be adopted for the balancing rod 530 to reduce materials and weight of the balancing rod 530 and reduce the cost.

In an embodiment, a gasket (not shown in the figures) may be arranged at an end, facing the first bracket 510, of the second bracket 520, and the support rod 422 is arranged in the gasket in a penetration manner. Therefore, when the driven member 425 of the support rod 422 is driven by the connecting block 423 to move towards one side of the second bracket 520, direct collision between the driven member 425 and the first bracket 510 may be avoided, buffering power is increased, and damage is avoided. The gasket may be, but not limited to, sponge, rubber, an elastic piece and the like.

Implementation modes that the driving mechanism assembly 400 controls the mounting driving assembly 300 will now be described with examples.

For example, a trigger button may be arranged on the side face 130 of the shell 100. The trigger button is coupled to a main board in the mobile terminal 10. When the user presses or touches the trigger button, the trigger button sends a trigger signal to a processor on the main board, and the processor controls the driving mechanism assembly 400 to drive the mounting seat 310 to extend from or into the accommodation groove 111 under the control of the driving mechanism assembly 400. In an embodiment, pressing the trigger button once may trigger the mounting seat 310 to extend from the accommodation groove 111 to a specified position under the control of the driving mechanism assembly 400, and in such case, the driving mechanism assembly 400 stops working. When the user presses the trigger button once again, the driving mechanism assembly 400 continues working, and in such case, the mounting seat 310 may rotate under the control of the driving mechanism assembly 400 to switch a front camera function and rear camera function of the camera or implement panoramic shooting. Of course, two trigger buttons may be arranged, one trigger button being configured to trigger the mounting seat 310 to extend from or into the accommodation groove 111 under the control of the driving mechanism assembly 400 and the other trigger button being configured to trigger the mounting seat 310 to rotate under the control of the driving mechanism assembly 400. Of course, the trigger button configured to control the mounting seat 310 to rotate may be enabled only when the mounting seat 310 extends from the accommodation groove 111 to the specified position.

In other embodiments, the trigger button may also be a touch icon arranged on the display screen 200, the touch icon may be clicked to send a related touch signal to the processor on the main board, and the processor receives the touch signal and executes a corresponding command according to the control signal to control the driving mechanism assembly 400 to drive the mounting seat 310 to extend from or into the accommodation groove 111.

For example, the trigger button may be a shooting starting icon, rotating function icon and shooting ending icon arranged in the display screen 200, and the rotating function icon may include multiple accessory selection icons (for example, a front and rear camera switching icon (rotating 180 degrees) and a panoramic shooting icon (a panoramic angle may be selected manually)). When the shooting starting icon is touched, the shooting starting icon sends a first trigger signal to the processor of the main board, and the processor receives the first trigger signal and controls the driving mechanism assembly 400 to drive the mounting seat 310 to extend from the accommodation groove 111 to the specified position, thereby enabling the camera 320 to shoot under a shooting signal. The rotating function icon is required to be enabled based on enabling of the shooting starting icon. When the front and rear camera switching icon is touched, the front and rear camera switching icon sends a second trigger signal to the processor of the main board, and the processor receives the second trigger signal and controls the driving mechanism assembly 400 to drive the mounting seat 310 to rotate, thereby enabling the user to use the camera 320 as a front or rear camera according to the using requirement. When the panoramic shooting icon is touched, the panoramic shooting icon sends a third trigger signal to the processor of the main board, the processor receives the third trigger signal and controls the driving mechanism assembly 400 to drive the mounting seat 310 to rotate a panoramic angle selected by the user, and in such case, the user is able to stand still and implement panoramic shooting. When the shooting ending icon is touched, the shooting ending icon sends a fourth trigger signal to the processor of the main board, and the processor receives the fourth trigger signal and controls the driving mechanism assembly 400 to drive the mounting seat 310 to extend into the accommodation groove 111.

Each technical characteristic of the embodiments may be freely combined, and for brief description, not all possible combinations of each technical characteristic in the embodiments are described. However, all the combinations of these technical characteristics shall fall within the scope recorded in the specification without conflicts.

The embodiments only express some implementation modes of the present disclosure, and relatively specific and detailed descriptions are made thereto but should not thus be understood as limits to the scope of the patent present disclosure. It is to be pointed out that those of ordinary skill in the art may further make a plurality of transformations and improvements without departing from the concept of the present disclosure and all of them fall within the scope of protection of the present disclosure. Therefore, the scope of protection of the patent present disclosure shall be subject to the appended claims.

What is claimed is:

1. A mobile terminal, comprising:
   a shell comprising a first mounting face, a second mounting face opposite the first mounting face, and a side face coupled between the first mounting face and the second mounting face, the first mounting face defining an accommodation groove extending to the side face along a first direction;
   a camera mounting assembly comprising a mounting seat and a camera arranged on the mounting seat, wherein the mounting seat is arranged in the accommodation groove and an image acquisition face of the camera faces the first mounting face or the second mounting face; and
   a driving mechanism assembly comprising a driver coupled to the shell and a transmission mechanism, wherein the transmission mechanism is arranged between an output end of the driver and the mounting seat, and the driver is configured to drive, by the transmission mechanism, the mounting seat to extend from the accommodation groove to a first position and a second position; at the first position, the image acquisition face of the camera exposes from the shell; between the first position and the second position, the driver is movable to drive, by the transmission mechanism, the mounting seat to rotate around a rotating shaft, and the rotating shaft is parallel to the first direction; the mounting seat is movable to keep the image acquisition face hidden in the accommodation groove.

2. The mobile terminal of claim 1, wherein the transmission mechanism comprises a rotating member coupled to the output end of the driver, a driving member coupled to an end, having a larger distance to the driver, of the rotating member, a support rod arranged on the mounting seat and coupled to the rotating member, and a driven member coupled to the support rod; the driver is drivable, by the rotating member and the support rod, to move the mounting seat to extend from the accommodation groove to the first position and the second position, and the driver is drivable, by a cooperation between the driving member and the driven member, to move the mounting seat to rotate around the rotating shaft in response to the mounting seat being between the first position and the second position.

3. The mobile terminal of claim 2, wherein the driver comprises a motor and the rotating member comprising a screw rod; a peripheral side of the screw rod defines a spiral groove; the transmission mechanism comprises a connecting block coupled to an end, having a larger distance to the mounting seat, of the support rod; the connecting block is provided with a fitting portion, and the fitting portion is embedded into the spiral groove to connect the connecting block with the screw rod in a sliding manner; the motor is configured to drive the screw rod to rotate to enable the connecting block to drive, by the support rod, the mounting seat to move.

4. The mobile terminal of claim 3, wherein the fitting portion is a fitting hole defined in the connecting block, and an inner wall of the fitting hole is embedded into the spiral groove to connect the connecting block with the screw rod in the sliding manner.

5. The mobile terminal of claim 3, wherein the connecting block and the support rod are fixed and integrated together, or the connecting block is coupled to the support rod in a rotating manner.

6. The mobile terminal of claim 3, comprising a bracket coupled to the shell, wherein the bracket comprises a first bracket and a second bracket; the first bracket, the second bracket and the mounting seat are sequentially arranged along the first direction, and both the rotating member and the connecting block are arranged between the first bracket and the second bracket; the driver is coupled to the first bracket, and the support rod is arranged in the second bracket in a penetration manner.

7. The mobile terminal of claim 6, wherein a balancing rod arranged in the connecting block in a penetration manner is arranged between the first bracket and the second bracket, and the balancing rod extends along the first direction.

8. The mobile terminal of claim 6, wherein the first bracket and the second bracket are fixed and integrated together.

9. The mobile terminal of claim 6, wherein a gasket is arranged at an end, facing the first bracket, of the second bracket, and the support rod is arranged in the gasket in a penetration manner.

10. The mobile terminal of claim 1, wherein the mounting seat rotates 180 degrees around the rotating shaft in response to the mounting seat moving from the first position to the second position.

11. The mobile terminal of claim 2, wherein the driving member comprises a driving gear, and the driven member comprises a driven gear.

12. The mobile terminal of claim 2, wherein the driving mechanism assembly comprises a gearbox, and the gearbox is coupled between the output end of the driver and the rotating member.

13. The mobile terminal of claim 11, wherein chamfers are arranged on a side, having a shorter distance to the driven gear, of gear teeth of the driving gear, arranged on a side, having a shorter distance to the driving gear, of the gear teeth of the driven gear, or both arranged on a side of the gear teeth of the driving gear and a side opposite the driving gear of the gear teeth of the driven gear.

14. The mobile terminal of claim 1, wherein the side face comprises two first side faces faced away from each other and two second side faces faced away from each other, and a length value of the first side face is larger than a length value of the second side face; the first direction is as same as a length extension direction of the first side face, or the first direction is as same as a length extension direction of the second side face.

15. The mobile terminal of claim 1, wherein the shell comprises a middle frame and a rear cover, the middle frame having a first mounting face and a second mounting face opposite the first mounting face; an outer wall face of the middle frame is the side face, and the rear cover is fixed on the first mounting face of the middle frame.

16. The mobile terminal of claim 15, comprising a display screen, the display screen being fixed on the second mounting face.

* * * * *